United States Patent
Gao et al.

(10) Patent No.: US 10,299,327 B2
(45) Date of Patent: May 21, 2019

(54) LED DEVICE AND CONTROL UNIT THEREOF

(71) Applicant: XIAMEN ECO LIGHTING CO. LTD., Xiamen (CN)

(72) Inventors: Yanzeng Gao, Xiamen (CN); Minghao Wu, Xiamen (CN)

(73) Assignee: XIAMEN ECO LIGHTING CO. LTD., Xiamen (CN)

( * ) Notice: Subject to any disclaimer, the term of this patent is extended or adjusted under 35 U.S.C. 154(b) by 0 days.

(21) Appl. No.: 15/397,680

(22) Filed: Jan. 3, 2017

(65) Prior Publication Data

US 2018/0092178 A1   Mar. 29, 2018

(30) Foreign Application Priority Data

Sep. 26, 2016   (CN) .......................... 2016 1 0849243

(51) Int. Cl.
*H05B 33/08*   (2006.01)

(52) U.S. Cl.
CPC ....... *H05B 33/0827* (2013.01); *H05B 33/083* (2013.01); *H05B 33/089* (2013.01); *H05B 33/0824* (2013.01)

(58) Field of Classification Search
None
See application file for complete search history.

(56) References Cited

U.S. PATENT DOCUMENTS

2012/0098448 A1*  4/2012  Kang ................... H05B 33/083
                                                                315/201
2015/0042234 A1*  2/2015  Lee .................... H05B 33/0824
                                                                315/193

* cited by examiner

*Primary Examiner* — Jany Richardson
(74) *Attorney, Agent, or Firm* — Chun-Ming Shih

(57) ABSTRACT

An LED device is disclosed. The LED device comprises a first LED light string, a second LED light string, a rectifying module, and a control unit. The control unit generates a driving current flowing through the first LED light string and the second LED light string. The control unit cuts off the driving current when the input signal is between a threshold voltage and a sum voltage.

15 Claims, 6 Drawing Sheets

LED DEVICE AND CONTROL UNIT THEREOF

FIELD OF THE INVENTION

The invention is related to the field of illumination, in particular to the field of LED device.

BACKGROUND OF THE INVENTION

LED light sources has advantages of high luminous efficiency, low heat generation, electricity saving, and long lifetime, thus having more and more wide applications. LED lights will gradually replace conventional illuminative lamps like incandescent lamps and halogen lamps. With the development of LED lights, LED lights are driven toward the trend of structural miniaturization. Common LED light driving circuits in the current market use an electrolytic capacitor for filtering after rectifications of voltage inputs, and inductors or transformers are also needed to be used in circuits.

Because the large volume of electrolytic capacitors occupy a larger space of driving circuits, the driving circuits are difficult to be further miniaturized. Also, the lifetime of electrolytic capacitors is greatly influenced by ambient temperature of the space of driving circuits, making electrolytic capacitors have premature failures, resulting in the shortened lifetime of the whole light. The larger volume of inductors and transformers also results in difficulties in miniaturizing driving structures.

SUMMARY OF THE INVENTION

One objective of the invention is to provide an LED device which is more power saving.

Another objective of the invention is to provide an LED device which can avoid peak heat generation when an input voltage level and a driving current are both high.

According to one aspect of the invention, an LED device is disclosed. The LED device comprises a first LED light string, a second LED light string, a rectifying module, and a control unit.

The rectifying module receives an input signal. The control unit is connected to the first LED light string and the second LED light string. The control unit is connected to the rectifying module. The control unit outputs an output current. The output current comprises a driving current flowing through the first LED light string and the second LED light string.

The control unit cuts off the driving current when the input signal is between a threshold voltage and a sum voltage. The sum voltage is at least a sum of a turn-on voltage of the first LED light string and a turn-on voltage of the second LED light string.

According to another aspect of the invention, a control unit for an LED driver circuit is disclosed. The driver circuit drives a plurality of LED strings. The control unit comprises a voltage input detection unit, a switch assembly, and a regulator module.

The voltage input detection unit detects a voltage level of an input signal and produces a detection output. The switch assembly is connected to the voltage input detection unit. The switch assembly connects the LED light strings in parallel when the voltage input detection unit determines that the voltage level of the input signal is lower than a predetermined level. The switch assembly connects the LED light strings in series when the voltage input detection unit determines that the voltage level of the input signal is higher than the predetermined level.

The regulator module generates a driving current for the LED light strings. The driving current is cut off for a time period when the switch assembly switches the LED light strings between a parallel connection and a series connection.

According to still another aspect of the invention, an LED device is disclosed. The LED device comprises a set of LED light strings, a rectifying module, and a control unit.

The rectifying module rectifies an input signal. The control unit is connected to the rectifying module. The control unit produces a driving current for the set of LED strings. The control unit cuts off the driving current for a period of time. The driving current has a first current value before the driving current is cut off. The driving current has a second current value after the driving current resumes from being cutting off. The first current value is different from the second current value.

DETAILED DESCRIPTION OF THE INVENTION

Figure 1:
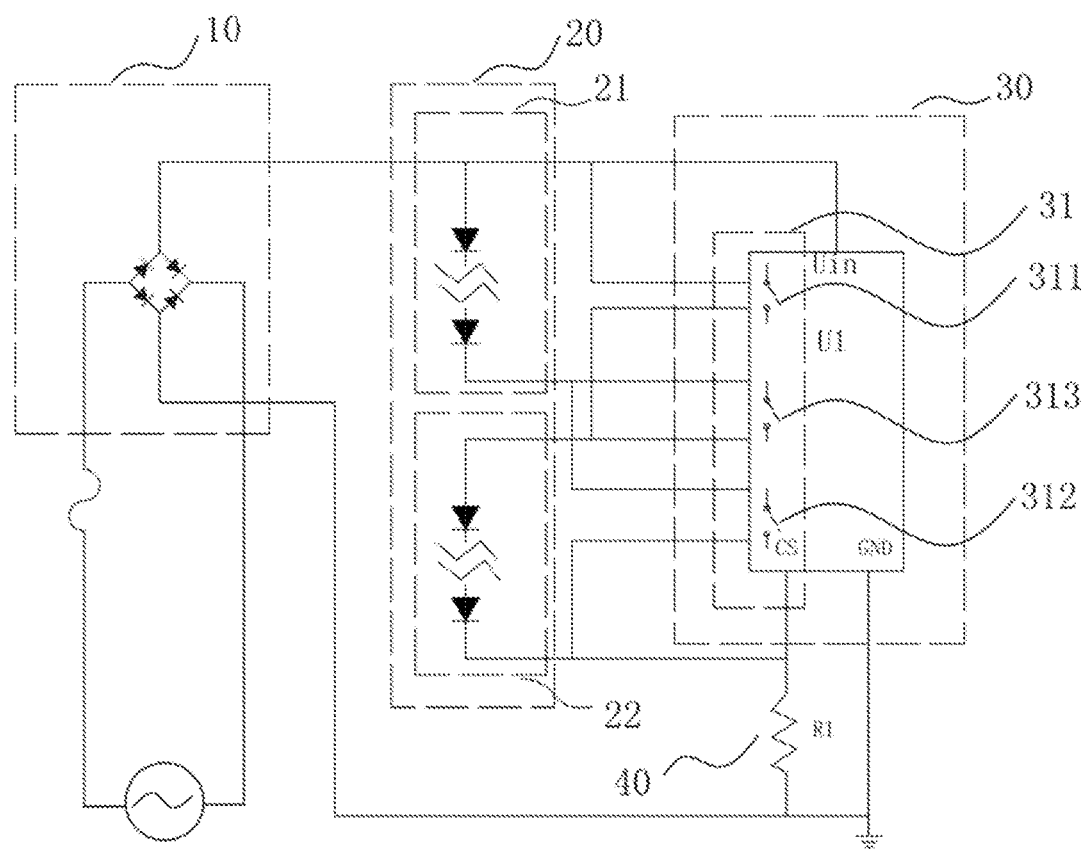
FIG. 1 shows an embodiment of an LED device.
Figure 2:
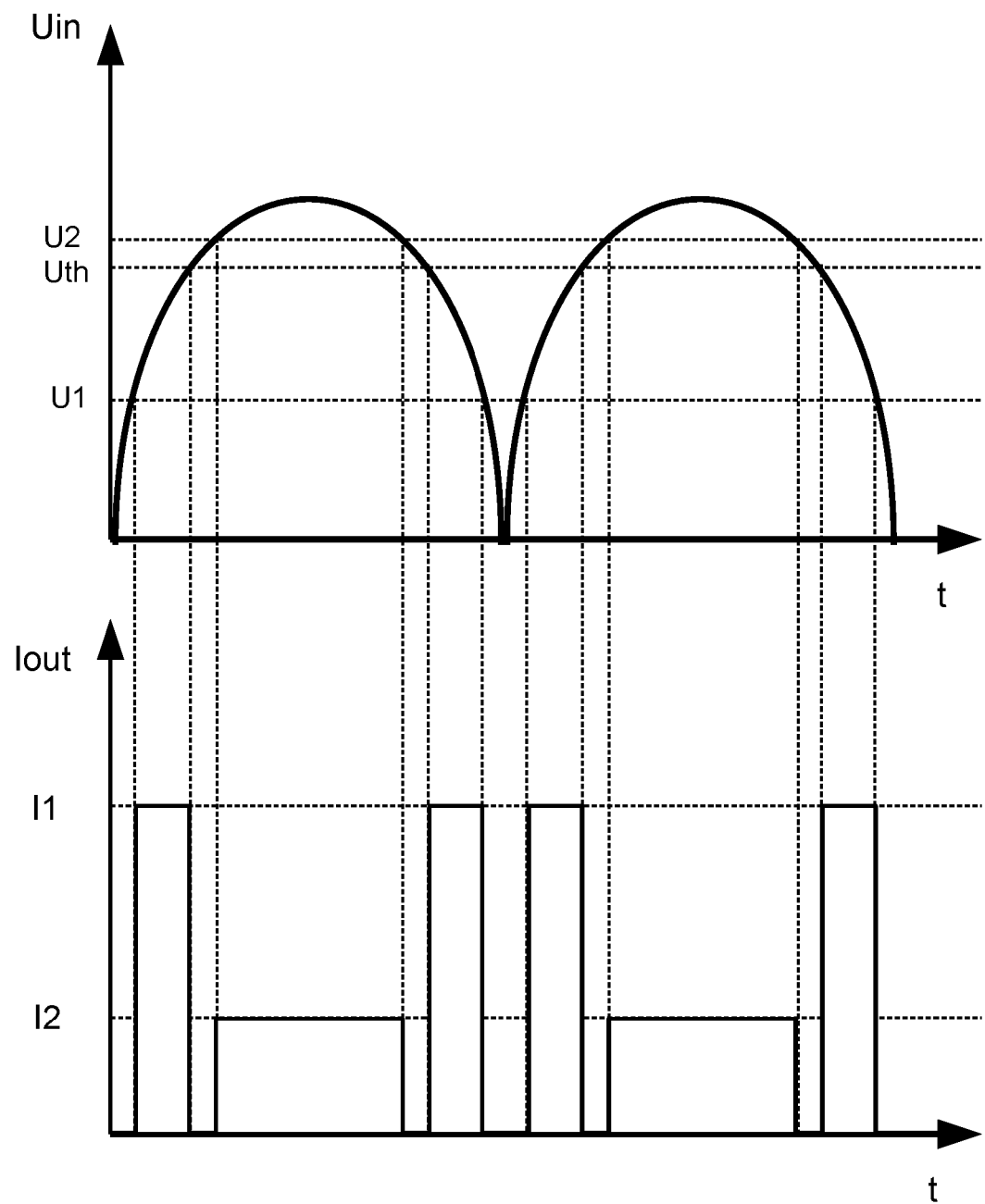
FIG. 2 shows wave forms of an input signal and an output current.
Figure 3:
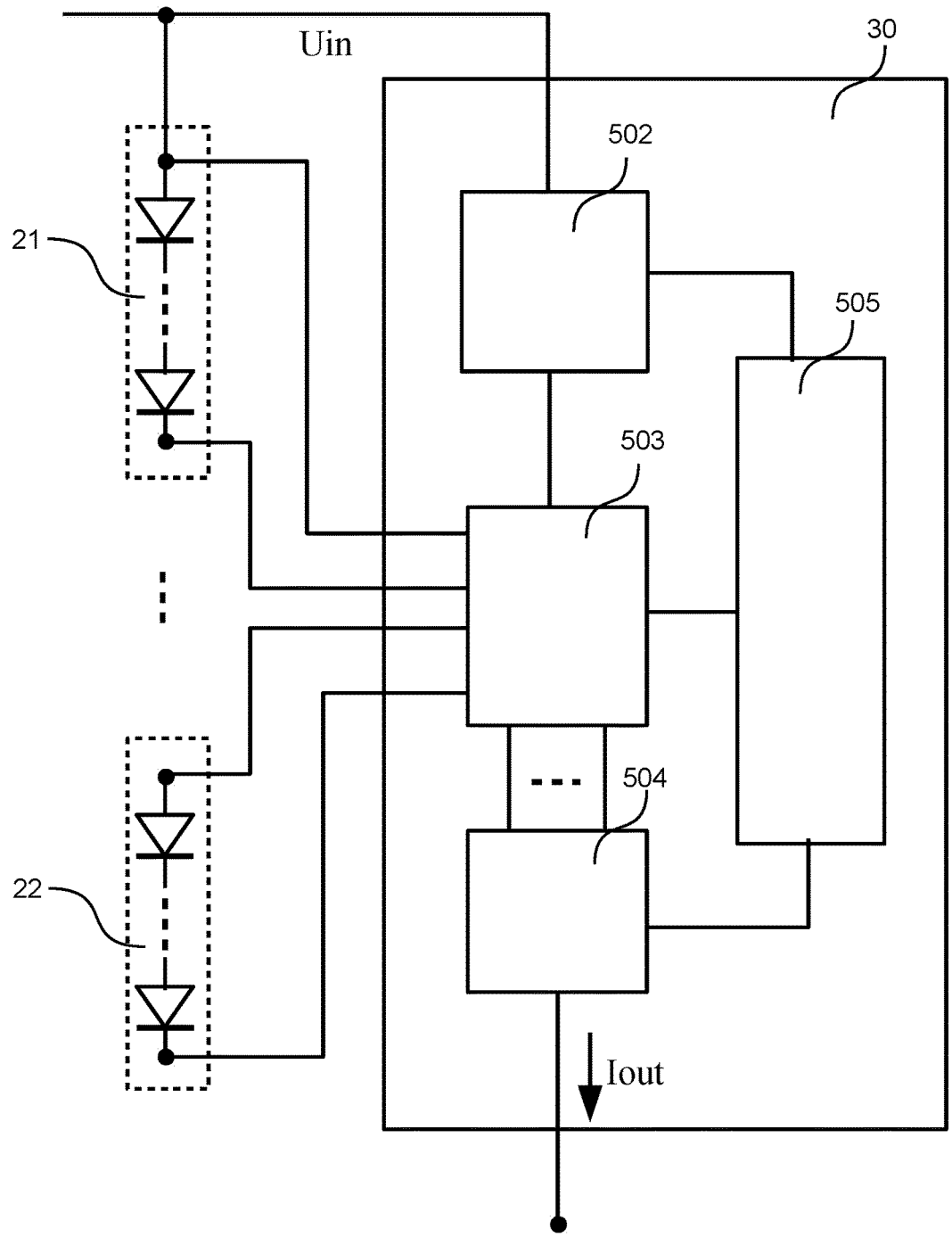
FIG. 3 shows an embodiment of a control unit.
Figure 4:
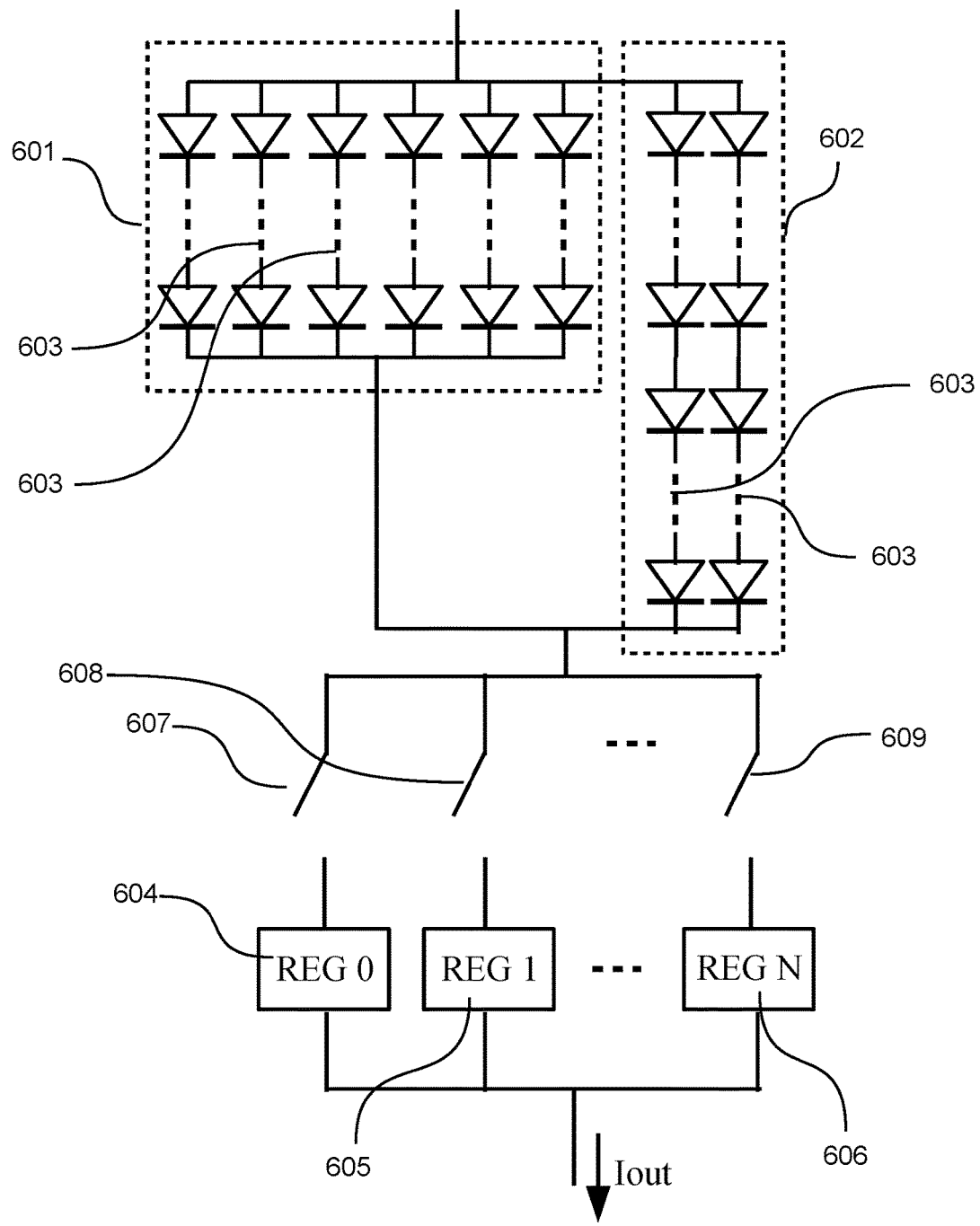
FIG. 4 shows an embodiment of a regulator module and corresponding regulator switches.
Figure 5:
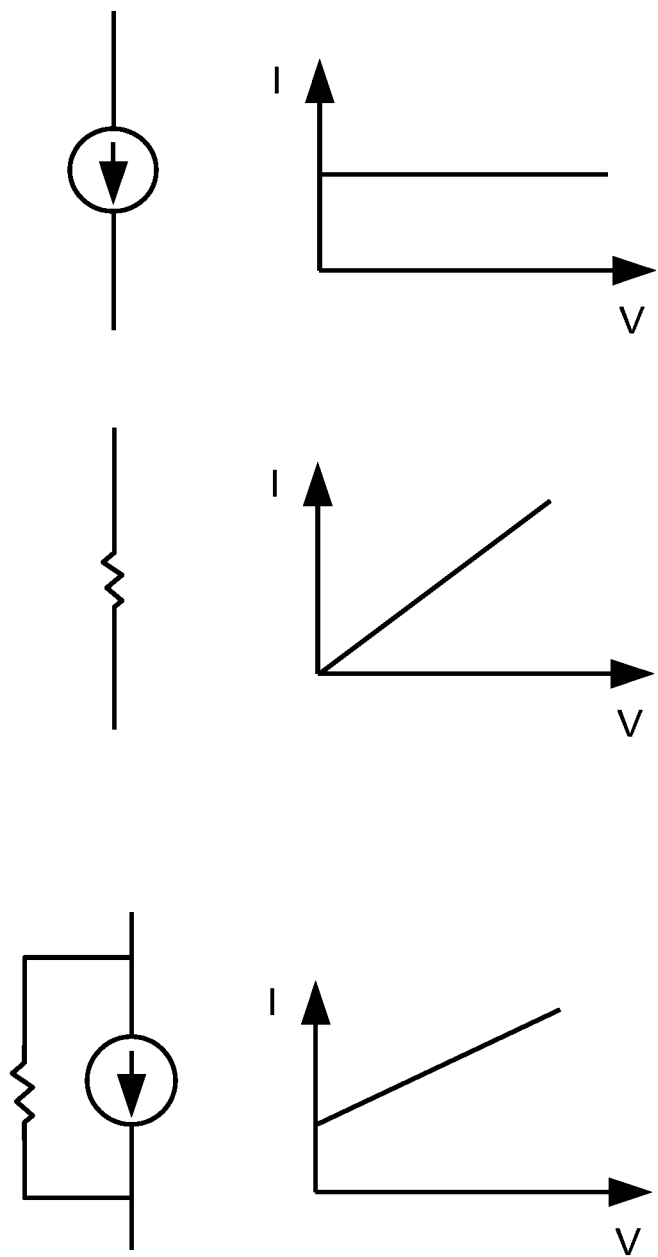
FIG. 5 shows three examples of regulators.
Figure 6:
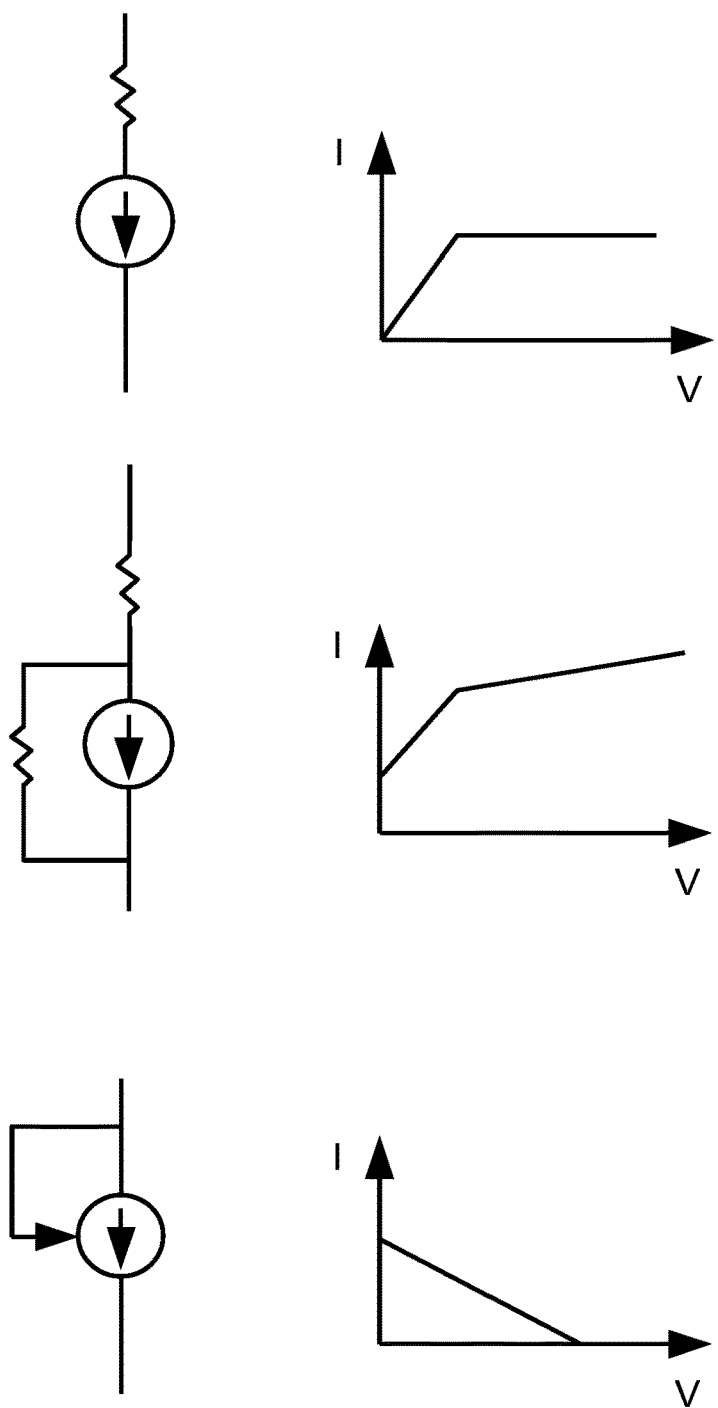
FIG. 6 shows another three example of regulators.

FIG. 1 shows an embodiment of an LED device. FIG. 2 shows wave forms of an input signal and an output current. FIG. 3 shows an embodiment of a control unit. FIG. 4 shows an embodiment of a regulator module and corresponding regulator switches. FIG. 5 shows three examples of regulators. FIG. 6 shows another three example of regulators. According to an embodiment, with reference to FIG. 1 and FIG. 2, an LED device 100 comprises a plurality of LED light strings 20, a rectifying module 10, and a control unit 30.

The LED light strings 20 include a first LED light string 21 and a second LED light string 22. In some embodiments, the rectifying module 10 provides full-wave rectification from an AC input. A resistor 40 can be placed on a path of the output current of the control unit 30. The resistor 40 is grounded at one end. The resistor 40 can also be used to adjust the output current. Although only two LED light strings are used as an example, more than two LED light strings can be employed in the LED device 30.

The first LED light string 21 has a first turn-on voltage. The second LED light string 22 has a second turn-on voltage. The rectifying module 10 receives an input signal Uin. The control unit 30 is connected to the first LED light string 21 and the second LED light string 22. The control unit 30 is connected to the rectifying module 10. The control unit 30 outputs an output current Iout. The output current Iout comprises a driving current flowing through the first LED light string 21 and the second LED light string 22. The driving current is used to drive the LED light strings 20. The first light string 21 can comprise a plurality light emitting diodes. The second light string 22 can comprise a plurality of light emitting diodes.

In some embodiments, with reference to FIG. 1 and FIG. 2, the control unit 30 further comprises a switch assembly 31. When a voltage level of the input signal Uin is higher than a first predetermined voltage level U1 but lower than a second predetermined voltage level U2, the switch assembly 31 connects the first LED light string 21 and the second LED light string 22 in parallel. When the voltage level of the input signal Uin is higher than the second predetermined voltage level U2, the switch assembly 31 connects the first LED light string 21 and the second LED light string 22 in series.

In some embodiments, the first predetermined voltage level U1 is greater than or equal to any one of the first turn-on voltage and the second turn-on voltage. In some embodiments, the second predetermined voltage level U2 is greater than or equal to a sum of the first turn-on voltage of the first LED light string 21 and the second turn-on voltage of the second LED light string 22.

In some embodiments, with reference to FIG. 1, the switch assembly 31 comprises a first switch 311, a second switch 312, and a third switch 313. When the voltage level of the input signal Uin is higher than the first predetermined voltage level and lower than the second predetermined voltage level U2, the first switch 311 is connected, the second switch 312 is connected, and the third switch 313 is disconnected so that the first LED light string 21 and the second LED light string 22 are connected in parallel. When the voltage level of the input signal Uin is higher than the second predetermined voltage level U2, the first switch 311 is disconnected, the second switch 312 is disconnected, and the third switch 313 is connected so that the first LED light string 21 and the second LED light string 22 are connected in series.

With reference to FIG. 2, in some embodiments, when the voltage level of the input signal Uin is lower than any one of the first turn-on voltage and the second turn-on voltage, no driving current flows through the first LED light string 21 or the second LED light string 22. In some embodiments, the first predetermined voltage level U1 is any one of the first turn-on voltage and the second turn-on voltage. In some embodiments, the first turn-on voltage is the same as the second turn-on voltage. In some embodiments, the first switch 311 and the second switch 312 are connected and the third switch 313 is disconnected when the input signal Uin is lower than the first predetermined voltage level U1.

When the input signal Uin rises and exceeds the first predetermined voltage level U1, the first LED light string 21 and the second LED light string 22 are connected in parallel and a constant current flows through each of the LED light string. In some embodiments, the output current Iout is I1, which is the same as the sum of all constant currents flowing through the LED light strings.

In a rising phase of the input signal Uin, when the voltage level of input signal Uin continues to rise and becomes higher than a threshold voltage Uth but lower than a sum voltage, the control unit 30 cuts off the driving current. In some embodiments, the sum voltage is at least a sum of the first turn-on voltage and the second turn-on voltage. In some embodiments, the sum voltage is the second predetermined voltage level U2.

In some embodiments, the detection of the threshold voltage Uth can be done by a voltage input detection unit 502 shown in FIG. 3. In some embodiments, the detection of the threshold voltage Uth can be implemented outside the control unit 30. In some embodiments, the threshold voltage Uth can be programmed from outside.

In the rising phase of the input signal Uin, when the voltage level of input signal Uin continues to rise and becomes higher than a sum voltage, the control unit 30 resumes the driving current from being cut off. The control unit 30 connects the first LED light string 21 and the second LED light string 22 in series, and the driving current, which is the output current in this case, is I2. The sum voltage is at least two times a turn-on voltage of any of the LED light strings. In some embodiments, the sum voltage is the second predetermined voltage level U2.

When the input signal Uin turns into a falling phase and the voltage level of the input signal Uin is lower than the sum voltage, the control unit 30 cuts off the driving current. The control unit 30 connects the first LED light string 21 and the second LED light string 22 in parallel. The sum voltage is at least two times a turn-on voltage of any of the LED light strings. In some embodiments, the sum voltage is the second predetermined voltage level U2.

When the voltage level of the input signal Uin keeps falling and becomes lower than the threshold voltage, the control unit 30 resumes the driving current from being cut off. In this case, the first LED light string 21 and the second LED light string 22 are still connected in parallel. When the voltage level of the input signal Uin continues to fall and becomes lower than the first predetermined voltage level U1, the driving current is turned off.

In some embodiments, the control unit 30 further comprises a regulator module 504 for generating a constant current for each of the first LED light string 21 and the second LED light string 22. In some embodiments, the rectifying module 10 is a bridge rectifier. In some embodiments, the LED device 100 further comprises a resistor connected between the rectifying module 10 and the control unit 30. The regulator module 504 is used to provide proper driving current for the LED light strings. In most cases, each LED light string requires a constant current. When the control unit 30 changes the connection of the LED light strings 20, the regulator module 504 adjusts the driving current to make sure that every LED light string has a proper constant current.

According to another embodiment, with reference to FIG. 1 and FIG. 3, a control unit 30 for an LED driver circuit 100 is disclosed. The driver circuit 100 drives a plurality of LED strings. The control unit 30 comprises a voltage input detection unit 502, a switch assembly 503, and a regulator module 504.

The voltage input detection unit 502 detects a voltage level of an input signal Uin and produces a detection output. The switch assembly 503 is connected to the voltage input detection unit 502. The switch assembly 503 connects at least a subset of the LED light strings in parallel when the voltage input detection unit 502 determines that the voltage level of the input signal is lower than a predetermined level. The switch assembly 503 connects the subset of the LED light strings in series when the voltage input detection unit 502 determines that the voltage level of the input signal is higher than the predetermined level. In some embodiments, the predetermined level is the voltage level U2.

The regulator module 504 generates a driving current for the subset of the LED light strings. The driving current is cut off for a time period when the switch assembly 503 switches the subset of LED light strings between a parallel connection and a series connection. In some embodiments, the regulator module 504 comprises a plurality of regulators REG 0 604, REG 1 605, and REG 2 606. Corresponding regulator switches 607, 608, and 609 are connected to the regulators REG0 604, REG 1 605, and REG 2 606. The regulator switches 607, 608, and 609 can be controlled to switch on or off particular regulators in order to provide proper current value for the LED light strings. The regulator switches 607, 608, and 609 can all be switched off and as a result all driving currents are cut off. With reference to FIG. 4, a set of LED light strings are connected to the regulators REG0 604, REG 1 605, and REG 2 606 through the regulator switches 607, 608, and 609. The set of LED light strings can be divided into a first subset 601 and a second subset 602. The first subset can comprise a plurality of unit LED light strings 603. In this embodiment, all unit LED light strings 603 in the first subset 601 are connected in parallel. The second subset 602 can comprises a plurality of unit LED light strings 603.

In the second subset 602, two unit LED light strings 603 are connected in series, and in turn, the longer LED light strings are connected in parallel. Any possible parallel and serial connections can be implemented by a switch assembly as long as proper switches are provided and are correctly connected. In some embodiments, a third subset and a fourth subset of the LED light strings 603 can be implemented with different type of parallel or serial connections. In some embodiments, the regulator switches 607, 608, and 609 can be implemented within the switch assembly 504.

In some embodiments, in a rising phase of the input signal Uin, when the voltage level of input signal Uin is higher than a threshold voltage Uth, the control unit 30 cuts off the driving current. In some embodiments, the switch assembly 503 further comprises a set of regulator switches 607, 608, and 609 for controlling the regulator module 504. The control unit 30 cuts off the driving current by disconnecting the set of regulator switches 607, 608, and 609.

In some embodiments, the regulator module 504 further comprises a plurality of regulators 604, 605, and 606 for providing the driving current. In some embodiments, the voltage input detection unit 502 is a comparator for comparing the voltage level of the input signal Uin with the predetermined level. In some embodiments, the control unit 30 further comprises a logic circuit 505 for controlling the voltage input detection unit 502, the switch assembly 503, and the regulator module 504.

According to another embodiment, with reference to FIG. 1 and FIG. 3, an LED device 100 comprises a set of LED light strings 21 and 22, a rectifying module 10, and a control unit 30. The rectifying module 10 rectifies an input signal Uin.

The control unit 30 is connected to the rectifying module 10. The control unit 30 produces a driving current for the set of LED strings 21 and 22. The control unit 30 cuts off the driving current for a period of time. The driving current has a first current value before the driving current is cut off. The driving current has a second current value after the driving current resumes from being cutting off. The first current value is different from the second current value. In some embodiments, with reference to FIG. 2, in the rising phase of the input signal Uin, the first current value is I1 and the second current value is I2. In the falling phase of the input signal Uin, the first current value is I2 and the second current value is I1.

In some embodiments, in a rising phase of the input signal Uin, when the voltage level of input signal Uin is higher than a threshold voltage Uth, the control unit 30 cuts off the driving current. In some embodiments, in a rising phase of the input signal Uin, when the voltage level of input signal Uin is higher than a sum voltage, the control unit 30 resumes the driving current from being cut off. The sum voltage is at least two times a turn-on voltage of any of the LED light strings. In some embodiments, the sum voltage is the second predetermined voltage level U2.

In some embodiments, in a falling phase of the input signal Uin, when the voltage level of input signal Uin is lower than a sum voltage, the control unit 30 cuts off the driving current. The sum voltage is at least two times a turn-on voltage of any of the LED light strings. In some embodiments, in a falling phase of the input signal Uin, when the voltage level of input signal Uin is lower than a threshold voltage Uth, the control unit 30 resumes the driving current from being cut off.

FIG. 5 shows three examples of regulators. FIG. 6 shows another three examples of regulators. Each of the regulators shown in FIG. 5 and FIG. 6 can be a design choice to implement a proper current source. Each regulator has a corresponding I-V curve to show its characteristics when applying different voltages and currents.

Since the LED driver circuit of the invention does not use electrolytic capacitors, inductors and transformers, but use the newly designed sectional constant current IC such that the serial/parallel relations between each LED light string can be flexibly combined and switched, the space can thus be greatly reduced. The driving circuit is easily miniaturized and the cost be reduced.

Since there is no electrolytic capacitor existing in the circuit, the hidden trouble of causing the shortened lifetime of the whole light due to premature failures of electrolytic capacitors is eliminated. The LED driver circuit can thus be used in situations with tightened space with higher requirement to the volume of devices such as MR16 and candle. In addition, the driving current for the LED light strings is cut off for a specific period, so that the heat problem caused by high voltage difference in the integrated circuit can be reduced. The LED device 30 is more power saving. The LED device 30 can avoid peak heat generation when an input voltage level and a driving current are both high.

What is claimed is:
1. An LED device, comprising:
   a first LED light string, the first LED light string having a first turn-on voltage;
   a second LED light string, the second LED light string having a second turn-on voltage;
   a rectifying module for receiving an input signal;
   a control unit, the control unit being connected to the first LED light string and the second LED light string, the control unit being connected to the rectifying module, the control unit outputting an output current, the output current comprising a driving current flowing through the first LED light string and the second LED light string; and
   wherein the control unit cuts off the driving current only when the input signal is between a threshold voltage and a sum voltage or when the input signal is below a first predetermined voltage level where the first predetermined voltage level is lower the threshold voltage, the sum voltage being at least a sum of the first turn-on voltage and the second turn-on voltage, the threshold voltage being greater than the first turn-on voltage.

2. The LED device of claim 1, wherein the control unit further comprises a switch assembly, when a voltage level of the input signal is higher than a first predetermined voltage level and lower than a second predetermined voltage level, the switch assembly connects the first LED light string and the second LED light string in parallel, and when the voltage level of the input signal is higher than the second predetermined voltage level, the switch assembly connects the first LED light string and the second LED light string in series.

3. The LED device of claim 2, wherein the first predetermined voltage level is greater than any one of the first turn-on voltage and the second turn-on voltage.

4. The LED device of claim 2, wherein the second predetermined voltage level is greater than a sum of the first turn-on voltage and the second turn-on voltage.

5. The LED device of claim 2, wherein the switch assembly comprises a first switch, a second switch, and a third switch, when the voltage level of the input signal is higher than the first predetermined voltage level and lower than the second predetermined voltage level, the first switch is connected, the second switch is connected, and the third switch is disconnected so that the first LED light string and the second LED light string are connected in parallel, and when the voltage level of the input signal is higher than the second predetermined voltage level, the first switch is disconnected, the second switch is disconnected, and the third switch is connected so that the first LED light string and the second LED light string are connected in series.

6. The LED device of claim 1, wherein when the voltage level of the input signal is lower than any one of the first turn-on voltage and the second turn-on voltage, no driving current flows through the first LED light string or the second LED light string.

7. The LED device of claim 1, wherein the control unit further comprises a regulator module for generating a constant current for each of the first LED light string and the second LED light string.

8. The LED device of claim 1, wherein the rectifying module is a bridge rectifier.

9. The LED device of claim 1, further comprising a resistor connected between the rectifying module and the control unit.

10. A control unit for an LED driver circuit, the LED driver circuit driving a plurality of LED strings, the control unit comprising:
a voltage input detection unit, the voltage input detection unit detecting a voltage level of an input signal and producing a detection output;
a switch assembly, the switch assembly being connected to the voltage input detection unit, the switch assembly connecting the LED light strings in parallel when the voltage input detection unit determines that the voltage level of the input signal is lower than a predetermined level, the switch assembly connecting the LED light strings in series when the voltage input detection unit determines that the voltage level of the input signal is higher than the predetermined level; and
a regulator module for generating a driving current for the LED light strings;
wherein the driving current is cut off for a time period only when the switch assembly switches the LED light strings between a parallel connection and a series connection or when the input signal is below a first predetermined voltage level where the first predetermined voltage level is lower said predetermined level.

11. The control unit of claim 10, wherein in a rising phase of the input signal, when the voltage level of the input signal is higher than a threshold voltage, the control unit cuts off the driving current.

12. The control unit of claim 10, wherein the switch assembly further comprises a set of regulator switches for controlling the regulator module, and the control unit cuts off the driving current by disconnecting the regulator switches.

13. The control unit of claim 10, wherein the regulator module further comprises a plurality of regulators for providing the driving current.

14. The control unit of claim 10, wherein the voltage input detection unit is a comparator for comparing the voltage level of the input signal with the predetermined level.

15. The control unit of claim 10, further comprising a logic circuit for controlling the voltage input detection unit, the switch assembly, and the regulator module.

* * * * *